UNITED STATES PATENT OFFICE.

ABRAHAM WOODARD, OF RUPERT, VERMONT.

REMEDY FOR DISEASES OF THE LIVER, &c.

SPECIFICATION forming part of Letters Patent No. 375,112, dated December 20, 1887.

Application filed September 25, 1886. Serial No. 214,498. (No specimens.)

*To all whom it may concern:*

Be it known that I, ABRAHAM WOODARD, of the town of Rupert, in the county of Bennington and State of Vermont, have invented a new and useful Medicinal Compound for the Treatment of Diseases of the Liver and Kidneys, of which the following constitutes a specification.

My compound consists of the following ingredients, combined in the proportions stated, viz: Infusion of inner bark of white birch, one gallon; tincture of juniper-berries, one pint; oil of winter-green, one-half fluid ounce; fluid extract of mandrake, (*Podophyllum*,) one ounce; honey, twelve avoirdupois ounces.

The above ingredients are to be prepared and mixed substantially after the following formula:

The bark employed is the inner bark from the common white birch of the North American forests, and is prepared by stripping it of its thin outer integument and then breaking, granulating, or pulverizing it to such a degree of fineness as will best facilitate the extraction of its virtues. I then digest four pounds of this granulated bark in a closed vessel in such an amount of water kept just below the boiling-point as will, when the proper strength is obtained, produce an infusion of about one gallon. This is allowed to stand and settle until cold. It is then racked off through a faucet into a suitable vessel, to receive the other ingredients. I then take two (2) ounces, by avoirdupois weight, of juniper-berries, dry and soak them in one pint of alcohol until their strength is abstracted and a tincture of juniper is thus obtained which is then added to the bark infusion above described. To the mixture thus obtained I then add one-half fluid ounce (½ f. oz.) of oil of winter-green, one fluid ounce (1 f. oz.) of fluid extract of mandrake, and twelve avoirdupois ounces (12 oz.) of honey. The whole is then well shaken up, when it is ready for use. It may then be bottled for use or sale. After standing for a time a partial separation of the ingredients takes place, which renders it necessary that the medicine should be well agitated before using.

This medicine is intended to be used in the treatment of Bright's disease, albuminuria, Addison's disease, renal calculus, and other derangements of the kidneys, for stone in the bladder, jaundice, and most liver complaints. The dose is a common table-spoonful three times a day, before meals, for an adult. For infants and children the dose should be proportioned to their ages and vigor of constitution.

I am aware that birch-bark and wintergreen have heretofore been combined in various preparations with other substances for various purposes—as, for instance, in Nos. 889 and 890 of Dick's Encyclopedia—and I do not therefore claim all compounds containing those ingredients in combination.

I claim as my invention—

The described compound for the treatment of diseases specified, consisting of white-birch bark, juniper-berries, oil of winter-green, extract of mandrake, (*Podophyllum*,) and honey, in the proportions substantially as specified.

In testimony whereof I have hereto subscribed my name, at North Bennington, Vermont, this 17th day of September, A. D. 1886.

ABRAHAM WOODARD.

In presence of—
FRANKLIN SCOTT,
E. H. WORTHINGTON.